United States Patent [19]

Glabe et al.

[11] 3,925,559

[45] Dec. 9, 1975

[54] ANIMAL FEEDS FOR HERBIVOROUS DOMESTIC ANIMALS

[75] Inventors: Elmer F. Glabe, Northbrook; Perry W. Anderson, Niles; Stergios Laftsidis, Chicago, all of Ill.

[73] Assignee: Food Technology, Inc., Chicago, Ill.

[22] Filed: June 28, 1974

[21] Appl. No.: 484,080

Related U.S. Application Data

[63] Continuation-in-part of Ser. No. 300,736, Oct. 25, 1972, abandoned, which is a continuation-in-part of Ser. No. 158,616, June 30, 1971, abandoned.

[52] U.S. Cl. .................. 426/2; 426/534; 426/623; 426/807
[51] Int. Cl.² ........................................... A23K 3/00
[58] Field of Search ....... 426/151, 2, 210, 221, 289, 426/295, 335, 377, 807

[56] References Cited
UNITED STATES PATENTS

| | | | |
|---|---|---|---|
| 2,475,368 | 7/1949 | Bauer | 99/140 R |
| 2,609,298 | 9/1952 | Kirby | 99/140 R |
| 3,672,914 | 6/1972 | Delaney | 99/140 R |

FOREIGN PATENTS OR APPLICATIONS

| | | | |
|---|---|---|---|
| 85,073 | 6/1958 | Denmark | 99/9 |

OTHER PUBLICATIONS

Feeds and Feeding, Mimsin, 22nd Ed., Mimsin Pub. Co., Ithaca, N. Y., 1957, p. 780.

Condensed Chemical Dictionary, 8th Ed., Van Nidrand Hanley, 5/26/71, pp. 798, 799.

*Primary Examiner*—Norman Yudkoff
*Assistant Examiner*—Hiram H. Bernstein
*Attorney, Agent, or Firm*—Johnston, Keil, Thompson & Shurtleff

[57] ABSTRACT

Animal feeds for herbivorous domestic animals are prepared containing sodium diacetate as an attractant.

6 Claims, No Drawings

ANIMAL FEEDS FOR HERBIVOROUS DOMESTIC ANIMALS

This application is a continuation-in-part of U.S. application Ser. No. 300,736 filed Oct. 25, 1972, which is a continuation-in-part of application Ser. No. 158,616, filed June 30, 1971 both abandoned.

BACKGROUND

It is known in the art to add various types of flavoring materials to animal feeds of a vegetable nature such as corn, alfalfa meal, soybean meal, and mixtures thereof with or without minerals, vitamins and other additives, e.g., methionine, Vitamin E and Vitamin A. Vanillin and other flavoring substances have also been added. In some cases such additives may improve the odor of the feed but do not necessarily improve its attractiveness to animals such as beef cattle, including calves, dairy cattle, swine, including baby pigs, sheep, including lambs, and goats, including kids. These animals differ from each other in their likes and dislikes and some of them such as cattle, sheep and goats have more than one stomach.

It is very difficult during certain times of the year to get animals to eat dry feed and in the case of some animals such as baby pigs, it would be desirable to increase the attractiveness of vegetable type feed so that they can be taken off of sows milk and fed with this type of feed at an earlier date. This would make it possible for the sows to have three litters of pigs a year rather than two.

In general, animals which are raised for meat and also dairy cattle are fed two different types of vegetable feed, namely, roughage, including hay and corn silage, and a supplemental ration usually containing corn, alfalfa meal, soybean meal, minerals and vitamins. In the case of an average dairy cow, for example, this supplemental ration might be within the range of 10 to 20 pounds per day. It can be prepared in the form of a ground mixture with or without pelleting.

For various reasons it would be desirable to increase the attractiveness of feeds to animals. One reason is to improve the general health of the animals. Another reason is to increase the feed intake of animals, especially herbivorous animals which are raised to be slaughtered for meat purposes, thereby increasing the weight of the animals and bringing them to market at an earlier date. A principal food of herbivorous animals is corn.

OBJECTS

One of the objects of the present invention is to provide a new and improved means for enhancing the properties of corn, either in the form of whole kernels, or cracked or ground corn, alone or in mixed animal feeds so as to make them more attractive to animals.

Another object of the invention is to provide new and improved animal feeds which not only contain an attractant but also are more stable on storage and retain their attractiveness to animals over a substantial period of time.

An additional object of the invention is to provide animal feeds in the form of feed supplements which contain an attractant for animals that improves the taste threshhold of the feed. Other objects will appear hereinafter.

BRIEF SUMMARY OF THE INVENTION

In accordance with the invention it has been found that sodium diacetate when added to animal feeds containing 25% to 100% by weight corn enhances the properties thereof as an attractant for herbivorous animals.

DETAILED DESCRIPTION OF THE INVENTION

The invention can be practiced in a number of different ways. The sodium diacetate can be added to high moisture corn (approximately 24% moisture) at levels within the range of 0.1% to 1.0% usually 0.3%, 0.6% and 0.9%. Inasmuch as sodium diacetate is a solid material the addition can be carried out in a batch feed mixer. The corn can be stored in open wood bins on a barn floor. Surface air movement will be sufficient to remove moisture produced by sweating of the corn. After the corn has been treated, it can be used as such as an animal feed or it can be stored and used at a later date or it can be mixed with other ingredients such as, for example, alfalfa meal, soybean meal, minerals and vitamins. The resultant mixture can be used as such as an animal feed or it can be pelleted and the pellets employed as an animal feed.

One method of preparing pellets is to grind corn, alfalfa meal, soybean meal, minerals and vitamins, add steam to bring the moisture content up to 16% water and then allow the mixture to stand and cool so that the final moisture content is around 14%. Sodium diacetate is added to this mixture either before or after pelleting in proportions sufficient to give a mixed feed containing, for example, 0.2% sodium diacetate, 0.6% sodium diacetate or 1.0% sodium diacetate. Tests have shown that this type of feed is very attractive to cattle. Cattle and hogs are also attracted to treated cereal grains such as treated corn containing sodium diacetate in the quantities indicated with or without the other ingredients used in preparing mixed feeds.

The sodium diacetate is preferably added to corn in the form of whole kernels containing their natural moisture content as they come from the field (e.g., 18% to 35% by weight) without artificial drying. Before use the corn is allowed to remain in contact with the sodium diacetate until the sodium diacetate penetrates the seed coat to the endosperm. The amounts used are usually within the range of 0.1% to 1.5% by weight and preferably from about 0.8% to 1.5% by weight of sodium diacetate. The corn containing sodium diacetate in the endosperm can be used as whole kernels or it can be cracked or ground and used as such or in mixed feeds. In case the product is to be used without lengthy storage and the sodium diacetate is employed primarily as an attractant as little as 0.1% to 0.2% of sodium diacetate will be sufficient to increase the taste threshhold and make the resultant feed more attractive to animals.

The invention will be further illustrated but is not limited by the following examples in which the quantities are given in parts by weight unless otherwise indicated.

EXAMPLE I

In a comparative palatability study a normal or conventional animal feed supplement containing ground corn, alfalfa meal, soybean meal, minerals and vitamins in the form of pellets about three-eighths inch in diameter and ¾ inch long was compared with the same animal feed containing various percentages of sodium diacetate in feeding unfed dairy cows. The tests were performed on hungry cows with the first feed in the morning and the same levels were repeated with the afternoon feeding. The feeding trough was divided into two sections, one containing the control pellets without the sodium diacetate and the other containing the same feed concentrate with sodium diacetate.

In a test involving 16 dairy cows where the amount of sodium diacetate in the sodium diacetate-containing feed was 1% by weight, 14 of the cows preferred the feed containing sodium diacetate and only two preferred the control concentrate. None of the cows left the feeding trough more than 30 minutes in either case. In this test there were no cows that did not show a preference for one type of feed or the other.

EXAMPLE II

The procedure was the same as in Example I except that the feed concentrate containing the 1% sodium diacetate had been stored for 60 days. In this test 35 dairy cows were fed. 21 of the dairy cows showed a preference for the feed concentrate containing the 1% sodium diacetate, 13 showed a preference for the control concentrate and only one showed no preference. One of the cows left the control concentrate more than 30 minutes and 4 of the cows left the sodium diacetate-containing concentrate more than 30 minutes.

EXAMPLE III

The procedure was the same as in Example I except that the sodium diacetate-containing pellets contained 0.6% by weight sodium diacetate. In this test there were 19 dairy cows, 5 of them preferred the control concentrate and 10 preferred the feed concentrate containing the sodium diacetate. 4 cows showed no preference. 2 of the cows that preferred the control concentrate left the concentrate more than 30 minutes. None of the cows that preferred the sodium acetate-containing concentrate left the concentrate more than 30 minutes.

EXAMPLE IV

The procedure was the same as in Example I except that the sodium diacetate-containing feed concentrate contained 0.2% sodium diacetate. In this test there were 18 dairy cows. Five preferred the control concentrate, 12 preferred the sodium diacetate-containing concentrate and one showed no preference. One of the cows that preferred the control concentrate left the concentrate more than 30 minutes. None of the cows that preferred the sodium diacetate-containing feed concentrate left the concentrate more than 30 minutes.

From the tests in Examples I to IV in 88 individual tests 65% of the cows preferred the feed containing sodium diacetate, 28% preferred the control ration and 7% showed no preference.

EXAMPLE V

The following procedure is used in treating high moisture corn for storage. The grain is cleaned as much as possible and sodium diacetate which is a dry, free-flowing, white powder is mixed with the corn by applying the sodium diacetate to the corn while the corn is passing through a screw conveyor. Aeration is used to reduce the temperature of the corn to 40°F. as soon as possible. The corn at 25% moisture should be stored in bins with aeration capacity of at least 1 cubic foot per minute per bushel of capacity.

The sodium diacetate is applied to the corn at the following rates, depending upon the moisture content of the corn:

| Moisture of Corn Per Cent by Weight | Pounds of Sodium Diacetate per Ton |
|---|---|
| 20–22 | 8 |
| 22–24 | 10 |
| 24–26 | 12 |
| 26–28 | 14 |
| 28–30 | 16 |

EXAMPLE VI

The test was made with beef cattle using untreated corn and corn treated as described in Example V. The corn had been treated in July and stored until October. The treated and untreated corn was placed in troughs so that the cattle could have a preference. The cattle ate all of the treated corn before they ate the untreated corn. These trials were repeated and the same results were observed each time.

EXAMPLE VII

A high moisture corn treated with sodium diacetate as described in Example V was fed to pigs to determine its acceptability. At that time the finishing pen was being fed shelled corn and pellets in self-feeders. For the test the treated corn was placed in small piles on the feeding floor near the self-feeders. The pigs did not eat any more corn out of the self-feeders until the piles of treated corn had been completely consumed.

The invention is therefore particularly important where it is desired to fatten herbivorous animals or maintain their health, especially beef cattle, dairy cattle, hogs, horses, sheep, goats and fowl. As previously indicated, as an attractant good results have been obtained by using the sodium diacetate at a level of 0.2% to 1.5% by weight. The feeds can be mixed and used in a pelleted or unpelleted form. The invention is also especially important where the corn has a moisture content from 16% to 35% and is susceptible to mold and where the feed is to be stored for a period of time.

The addition of sufficient sodium diacetate causes penetration of the seed coat by the sodium diacetate into the endosperm of the corn and the formation of mold is inhibited under typical farm storage conditions. Usually the amount of sodium diacetate required to render stored corn kernels impervious to mold growth when applied uniformly to the surface of the kernels where the latter have a moisture content of 21% to 23% by weight will be around 0.8%. As the moisture content is increased the amount of sodium diacetate is increased approximately 0.06% by weight for every 1% by weight increase in moisture in the corn. Thus, as the amount of corn moisture increases from 22% by weight to 32% by weight, the amount of sodium diacetate would be increased from 0.8% by weight to 1.5% by weight.

These amounts of sodium diacetate are higher than the amount of sodium diacetate required to serve as an attractant or to improve the taste threshhold in animals but herbivorous animals are attracted to animal feeds containing sodium diacetate at both lower levels and higher levels within the range of 0.1% to 1.5% by weight of sodium diacetate based on the weight of the animal feed.

The invention is hereby claimed as follows:

1. A process of feeding herbivorous animals selected from the group consisting of cattle, pigs, horses, sheep, goats and fowl, which comprises feeding such animals with animal feed containing sodium diacetate in sufficient amount to serve as an attractant and to enhance the taste threshhold of said feed, the quantity of sodium diacetate added thereto being within the range of 0.1% to 1.5% by weight of the total feed, and said feed to which said sodium diacetate is added being selected from the group consisting of corn and mixed feeds containing at least 25% by weight of corn.

2. A process as claimed in claim 1 in which said animal is a beef animal.

3. A process as claimed in claim 1 in which said animal is a dairy cow.

4. A process as claimed in claim 1 in which said animal is a pig.

5. A process as claimed in claim 1 in which said sodium diacetate is added to the corn component of said feed while the corn is in the form of whole kernels containing a natural moisture content of 16% to 35% by weight without artificial drying, the corn being allowed to remain in contact with the sodium diacetate until the sodium diacetate has penetrated the seed coat to the endosperm.

6. A process as claimed in claim 5 in which the corn containing sodium diacetate in the endosperm is ground.

* * * * *